US006991078B2

(12) United States Patent
Leber

(10) Patent No.: US 6,991,078 B2
(45) Date of Patent: Jan. 31, 2006

(54) HYDRODYNAMIC CONVERTER WITH A PRIMARY CLUTCH

(75) Inventor: Fritz Leber, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/771,722

(22) Filed: Feb. 4, 2004

(65) Prior Publication Data

US 2004/0188207 A1 Sep. 30, 2004

(30) Foreign Application Priority Data

Mar. 28, 2003 (DE) ................................ 103 14 324

(51) Int. Cl.
*F16H 45/02* (2006.01)

(52) U.S. Cl. .................. 192/3.27; 192/3.29; 192/106 F

(58) Field of Classification Search ............... 192/3.21, 192/3.25, 3.27, 3.29, 106 F, 113.36
See application file for complete search history.

(56) References Cited

U.S. PATENT DOCUMENTS 2,258,684 A * 10/1941 Lysholm et al. ........... 192/3.27
3,202,253 A * 8/1965 Bolster et al. ......... 192/113.36
3,213,983 A * 10/1965 Smirl et al. .............. 192/106 F
3,326,338 A 6/1967 Mattli ........................ 192/3.3
3,537,262 A 11/1970 Briski ........................... 60/54
3,820,417 A 6/1974 Allen et al. .................... 74/733
4,147,242 A * 4/1979 Fujioka ..................... 192/3.27
4,982,620 A * 1/1991 Holbrook et al. ............ 192/3.3
5,509,520 A 4/1996 Evans et al. ............... 192/3.23
2003/0111314 A1* 6/2003 Moorman et al. ....... 192/106 F

FOREIGN PATENT DOCUMENTS

| | | |
|---|---|---|
| DE | 1 550 973 | 10/1969 |
| DE | 2 006 955 | 9/1970 |
| DE | 77 18 674 | 9/1978 |
| DE | 195 21 458 A1 | 12/1995 |
| GB | 870863 | 6/1961 |

* cited by examiner

*Primary Examiner*—Rodney H. Bonck
(74) *Attorney, Agent, or Firm*—Davis & Bujold, P.L.L.C.

(57) ABSTRACT

A hydrodynamic converter for the power train of a motor vehicle is proposed which comprises one pump (2), one turbine (3) connected with the transmission input shaft (4) and one stator (guide wheel) (5) and in which the pump (2) is detachably connectable via a primary clutch (PK) with the input of the engine, the primary clutch (PK) being situated in the transmission (G).

19 Claims, 7 Drawing Sheets

HYDRODYNAMIC CONVERTER WITH A PRIMARY CLUTCH

This application claims priority from German Application Serial No. 103 14 324.6 filed Mar. 28, 2003.

FIELD OF THE INVENTION

The invention concerns a hydrodynamic converter with a primary clutch for the power train of a motor vehicle, particularly of a working machine, such as of a wheel loader of a lift truck or of a dumper.

BACKGROUND OF THE INVENTION

Since the introduction of automatic transmissions, hydrodynamic converters have been the connecting element between a prime mover and the transmission proper. A converter makes possible, on one hand, a comfortable jolt-free start through the slip and at the same time dampens irregularities of rotation of the internal combustion engine. On the other hand, the fundamental increase of the torque makes available a great starting torque.

According to the prior art, a hydrodynamic converter is comprised of an impeller, a turbine wheel, the reaction element (guide wheel, stator) and the oil needed for torque transmission.

The impeller, which is driven by the engine, moves the oil in the converter to a circular current. Said oil current hits upon the turbine wheels where it is turned around in flow direction.

In the hub area, the oil leaves the turbine and arrives at the reaction element (guide wheel) where it is again turned around and thus fed to the impeller in the proper flow direction.

Due to the reversal, in the stator a torque generates whose reaction increases the turbine torque. The ratio of turbine torque to pump torque is designated as torque increase. The greater the rotational speed difference between pump and turbine, the greater the torque increase which has the maximum magnitude when the turbine is stationary. As the turbine rotational speed increases, the height of the torque consequently decreases. If the turbine rotational speed rises to about 85% of the pump rotational speed, the torque increase=1, that is, the turbine torque is equal to the pump torque.

The stator, which props itself toward the transmission housing via the freewheel and the stator shaft, flows freely in this state in the current and the freewheel is rolled over.

From this point on, the converter works as pure flow clutch. During the conversion, the stator remains still and is propped toward the housing via the freewheel.

Converters are known from the prior art which comprise one converter lock-up clutch and one primary clutch, said primary clutch being inserted between engine and converter and the lock-up clutch between engine and transmission.

Such converters are usually provided for vehicles which perform works at very low speeds but can also move at high speeds. Within the scope of DE 195 21 458 Al is described, by way of example, a converter with lock-up clutch and primary clutch. According to the prior art, there are, respectively, provided for converter lock-up clutch and primary clutch its own pressure supply and its own valve unit.

Converters are also known which comprise one converter lock-up clutch and are especially used in transportation vehicles such as dumpers or cranes. On the other hand, converters with primary clutch are used in working machines like wheel loaders or lift trucks.

The problem on which this invention is based is to provide a hydrodynamic converter in which the pump is detachably connectable via a primary clutch with the output from the engine.

SUMMARY OF THE INVENTION

A hydrodynamic converter for the power train of a motor vehicle is accordingly proposed which comprises one pump, one turbine connected with the transmission input shaft and one stator (guide wheel) and in which the pump is detachably connectable with the engine input via a primary clutch, the latter being located in the transmission.

According to the invention, the primary clutch is mounted in the transmission so that the converter can be subsequently inserted, it being possible that the converter is one with/without freewheel, the same as with/without lock-up clutch.

The primary clutch can be designed here as positive clutch or negative clutch actuatable by transmission system pressure, or as clutch actuatable by converter pressure. Depending on the design, the clutch can be lubricated via the transmission system or via the converter circuit.

BRIEF DESCRIPTION OF THE DRAWINGS

The invention will now be described, by way of example, with reference to the accompanying drawings in which.

DETAILED DESCRIPTION OF THE INVENTION

Figure 1:
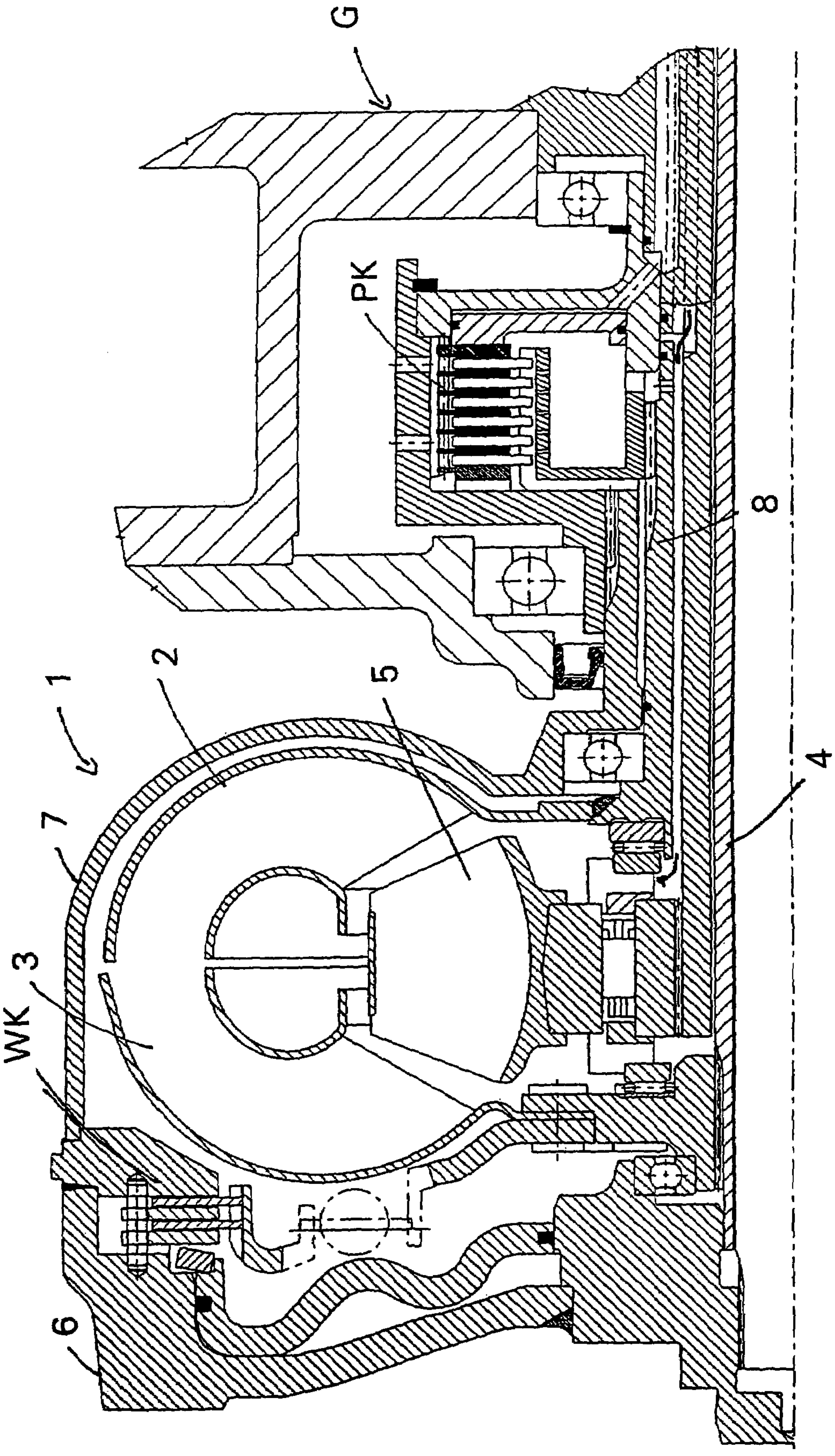
FIG. 1 is a first embodiment of the instant invention in which a primary clutch and a converter lock-up clutch are provided.

In FIG. 1 is shown a hydrodynamic converter 1 comprising one pump 2, one turbine 3 connected with the transmission input shaft 4 and one stator (guide wheel) 5. Also shown are the output 6 from the engine and the converter shell 7. The converter 1 comprised one lock-up clutch WK placed on the engine side and detachably connecting the input 6 with the transmission or the transmission input shaft 4. According to the invention, the primary clutch PK is not situated in the converter, but in the transmission G and connects the output 6 from the engine via the converter shell 7 with the hub 8 of the pump 2.

The primary clutch PK is sealed relative to the oil of the converter circuit; the clutch is lubricated and cooled from the transmission system, the cooling oil then flowing off into the transmission sump. In the embodiment shown in FIG. 1 the primary clutch PK is designed as "positive clutch," that is, it is closed under pressurization. The primary clutch is here closed with transmission system pressure, it being possible to regulate the pressure "black-white" or via a pressure ramp independently of the converter pressure.

Figure 2:
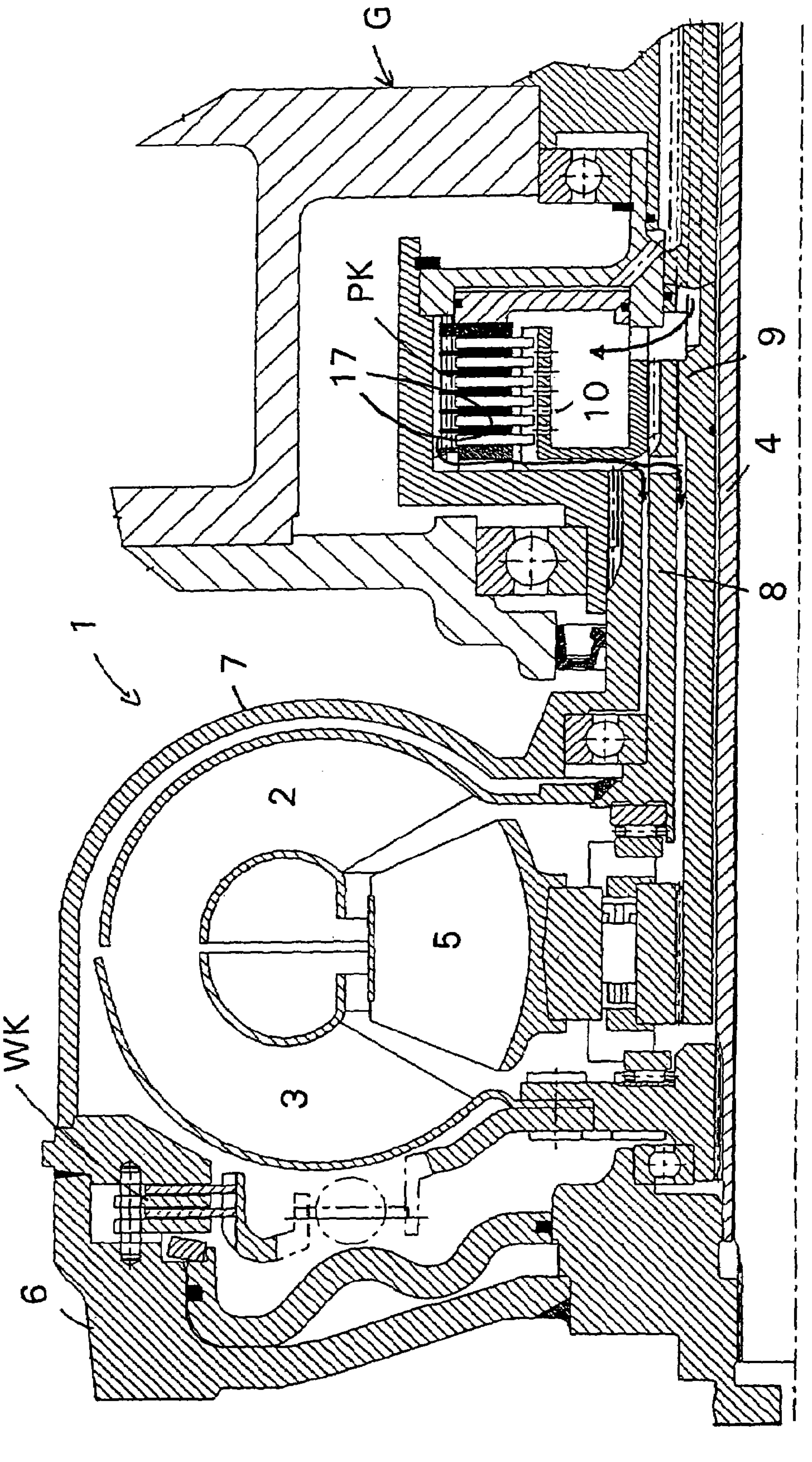
FIG. 2 is a second embodiment of the instant invention in which a primary clutch and a converter lock-up clutch are provided.

In FIG. 2 is shown one other embodiment in which the oil fed to the converter 1 flows through the primary clutch (see arrows in the figure) so that the primary clutch be sufficiently lubricated and cooled during "permanent slip." To this end the gap between pump hub 8 and stator shaft 9 is sealed (sealing ring or narrow gap) so that the oil can be fed to the inner disc carrier; the oil then arrives at the discs through apertures 10.

According to the invention, grooves 17 are provided in the friction lining which convey the oil outwardly where it is collected in the deep interstices of the spline. The oil is inwardly guided into radial grooves in the end disc and the inner disc carrier and then can flow axially to the converter into the gap between pump hub 8 and converter shell 7. In addition, the oil can flow via holes in the gap between pump hub 8 and stator 9 in the converter. The primary clutch is closed under pressurization, the closing pressure of the transmission system being superposed on the converter inner pressure.

Figure 3:
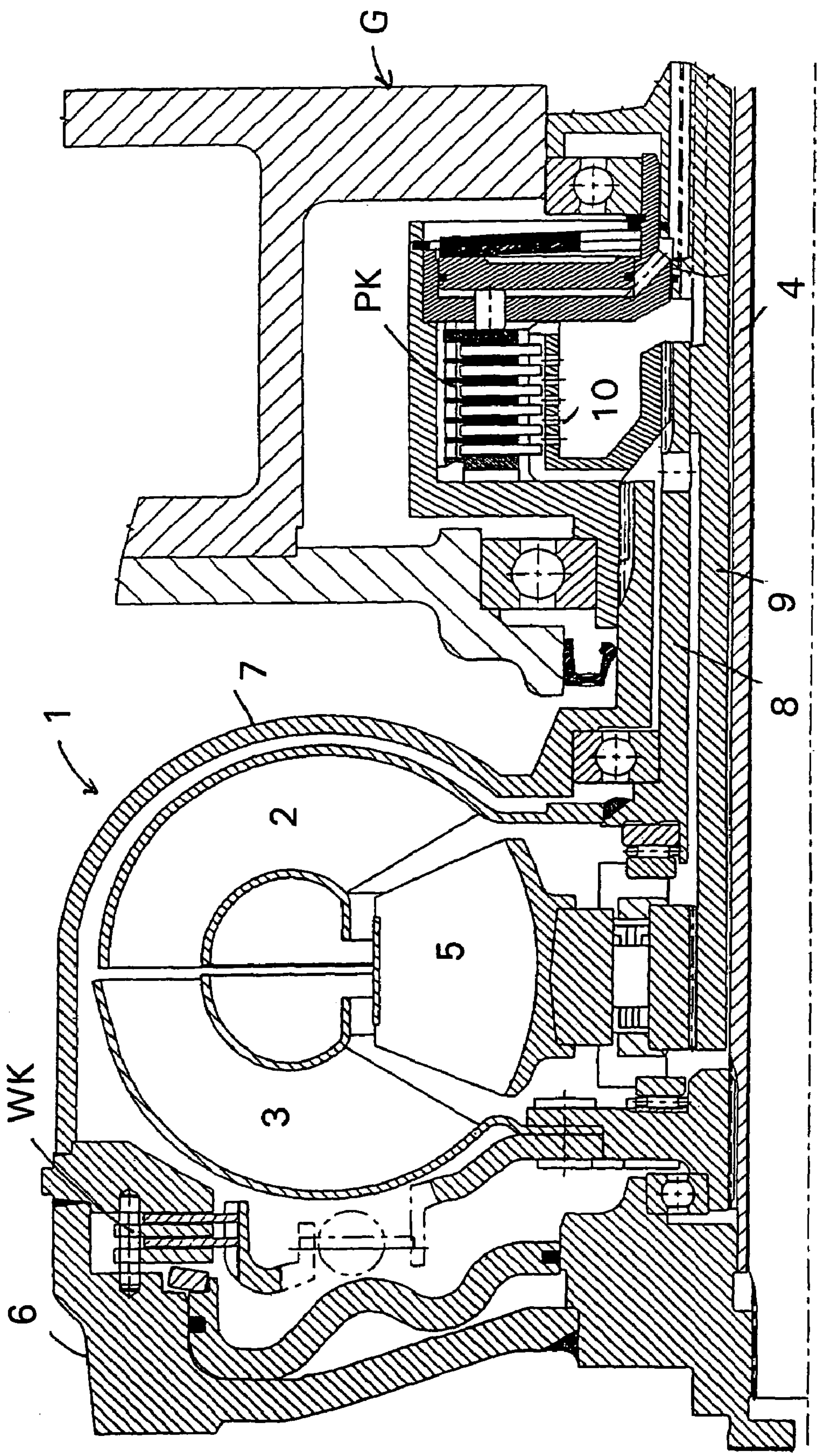
FIG. 3 is one other embodiment of the instant invention in which a primary clutch and a converter lock-up clutch are provided.

Within the scope of the embodiment shown in FIG. 3, the primary clutch PK is designed as negative clutch; it is closed with spring force 12 and opened with pressure, it being independent of the inner pressure of the converter (up to the surface of the pressure bolts). To control said primary clutch, the pressure can be regulated "black-white" or via a pressure ramp independently of the converter pressure.

Figure 4:
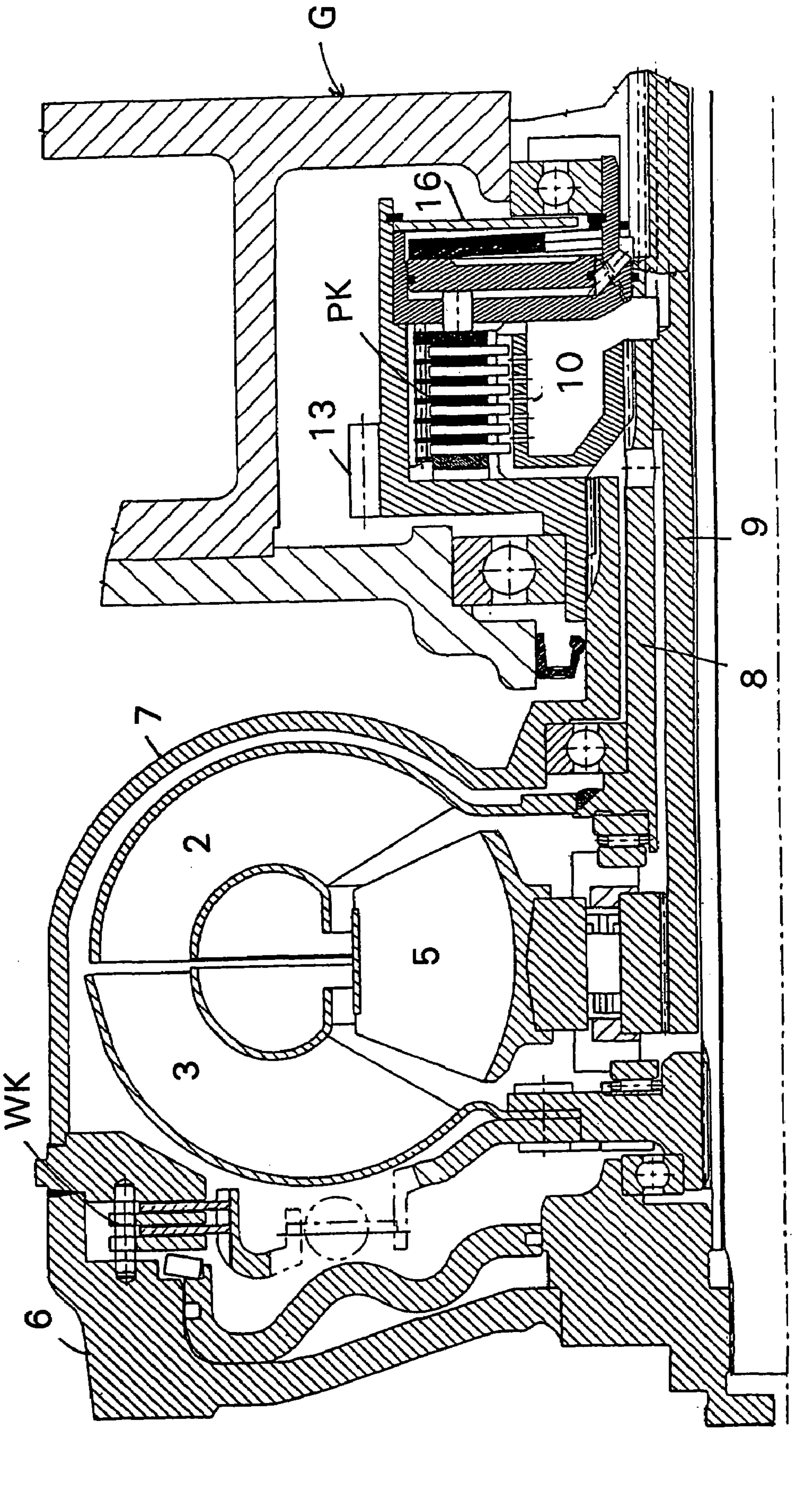
FIG. 4 is a fourth embodiment of the instant invention in which a primary clutch and a converter lock-up clutch are provided.

As shown in FIG. 4, a rotation-pressure compensation can be achieved by an additional baffle plate 16.

According to the invention, the primary clutch can also be actuated via the converter pressure. The higher the engine rotational speed, the higher becomes the through flow resistance and the higher is then the piston force or the clutch torque.

In those primary clutches in which the primary clutch is actuated via the converter pressure, said converter pressure acts against the pistons by lowering the pressure behind the piston 11 so that the piston presses upon the disc set and closes the clutch. Such an embodiment is the object of FIG. 5.

Figure 6:
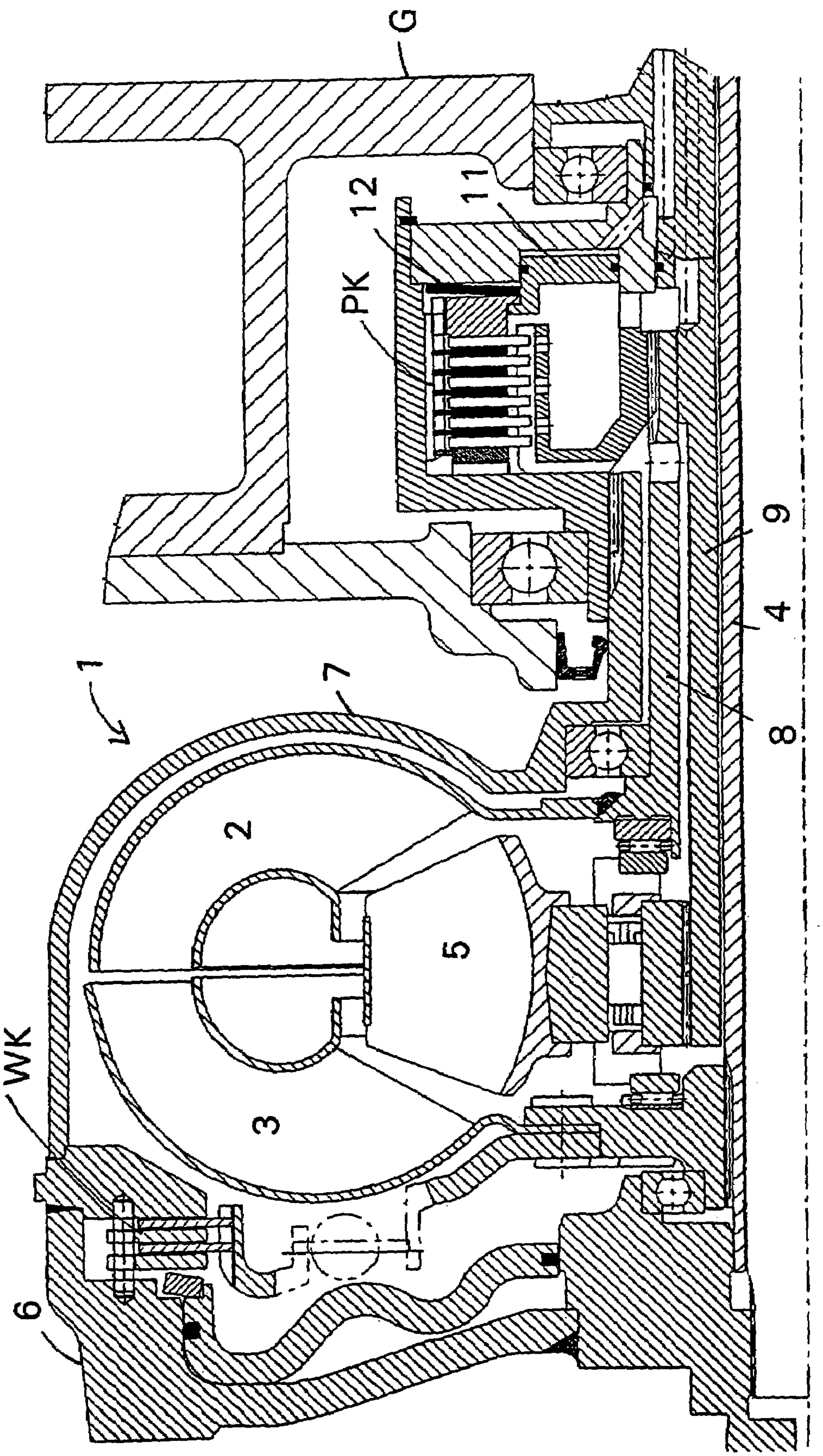
FIG. 6 is a sixth embodiment of the instant invention in which a primary clutch and a converter lock-up clutch are provided.

In FIG. 6 is, likewise, shown a primary clutch PK actuatable via the converter pressure and closed by means of the force of a spring 12. By lowering the pressure behind the piston 11 the converter pressure pushes the piston against the spring 12 and opens the clutch.

Figure 5:
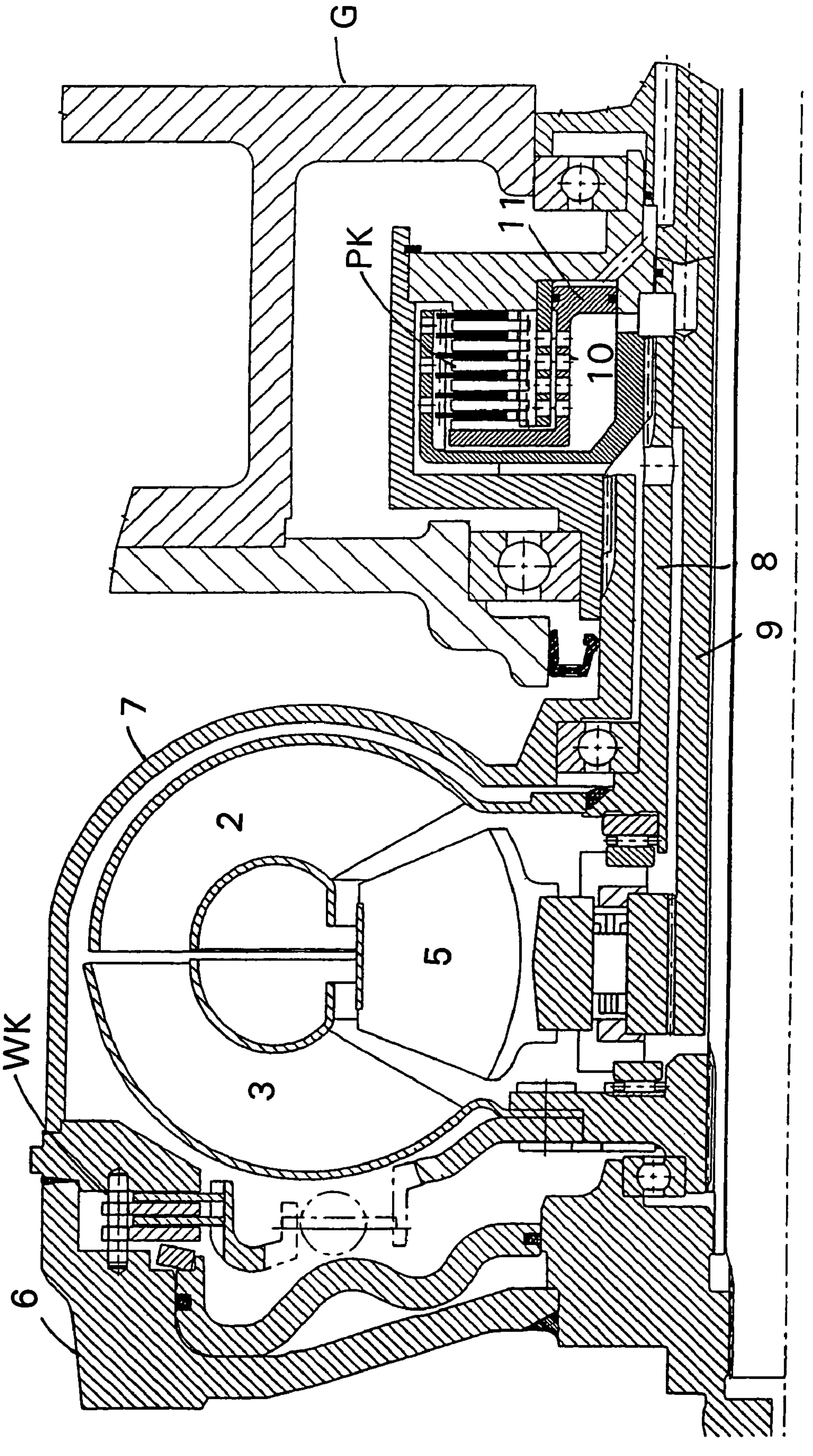
FIG. 5 is a fifth embodiment of the instant invention in which a primary clutch and a converter lock-up clutch are provided.

The primary clutches provided in the embodiments of FIGS. 5 and 6 can operate only in the design flowed through in converter oil, since they need the converter pressure for their actuation.

As shown in FIG. 4, according to the invention a toothing 13 can be mounted on the outer border of the primary clutch PK. Said toothing can advantageously be used for driving accessory units, PTO's, direct engine-driven gears (in this case the WK can be eliminated) and/or to caliper the engine rotational speed.

Figure 7:
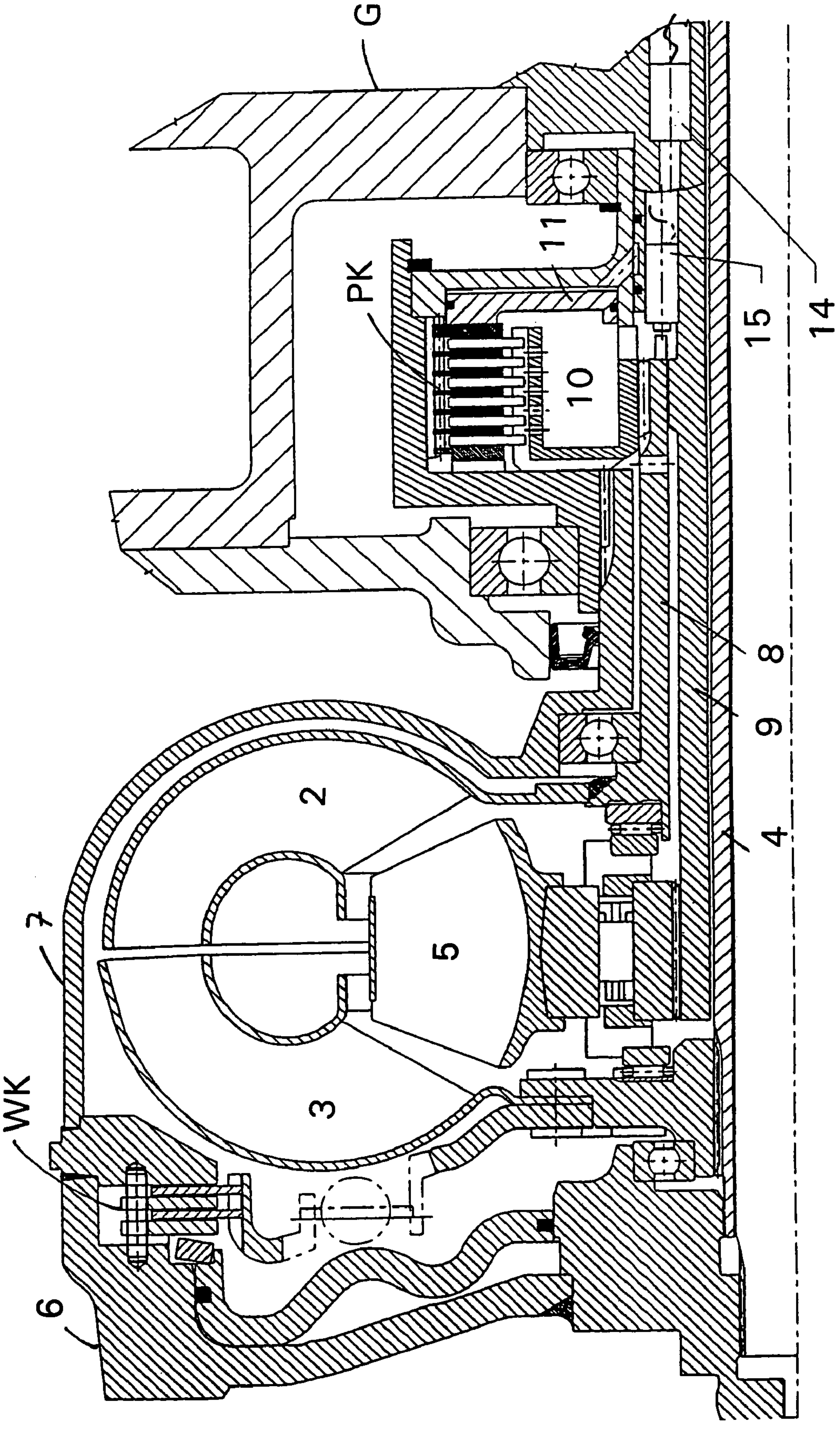
FIG. 7 is one other embodiment of the instant invention in which a primary clutch and a converter lock-up clutch are provided.

In all embodiments sensors can be installed, for example, one pressure sensor 14 to detect the pressure before the piston 11, or a rotational speed sensor 15 to detect the pump rotational speed. This is shown by way of example in FIG. 7.

With the exception of the embodiments in FIGS. 3 and 4, in embodiments where converter oil flows through the primary clutch, for exact regulation of the clutch, the converter pressure (which stands before the piston) must be included for determining the clutch actuation pressure. The calipering of the converter pressure is here relatively simple, since the space is situated immediately over the stator shaft 9. This allows a pressure return to the control valve as well as the housing of a pressure sensor. The signal of the pressure sensor is processed together with the driver's requests or/and from the vehicle in an electronic system which then, for example, controls a proportional valve which issues the actuation pressure of the clutch.

REFERENCE NUMERALS

1 hydrodynamic converter
2 impeller
3 turbine
4 transmission input shaft
5 stator
6 drive system of the engine
7 converter shell
8 pump hub
9 guide wheel shaft
10 aperture
11 piston
12 spring
13 toothing
14 pressure sensor
15 rotational speed sensor
16 baffle plate
PK primary clutch
WK converter lock-up clutch
G transmission

What is claimed is:

1. A hydrodynamic converter for a power train of a motor vehicle comprising one pump (2), one turbine (3) connected with a transmission input shaft (4) and one stator (5), and the pump (2) being detachably connectable, via a primary clutch (PK), with an output (6) from an engine:

wherein said primary clutch (PK) is situated in a transmission (G);

converter oil flows through said primary clutch (PK) and the primary clutch (PK) is actuatable by converter pressure;

said primary clutch (PK) is engaged by spring (12), a piston (11) of said primary clutch (PK) is movable by the converter pressure, against a bias of the spring (12), so that said primary clutch (PK) disengages, and a gap between a pump hub (8) and a guide wheel shaft (9) is sealed so that the oil can be fed to an inner disc carrier of said primary clutch (PK), and said inner disc carrier has apertures (10) such that the oil arrives at discs by passing through said apertures (10), grooves are provided in a friction lining which outwardly convey the oil, and the oil flows axially to said converter (1) through a gap between the pump hub (8) and a converter shell (7) and via holes in the gap between the pump hub (8) and the guide wheel shaft (9).

2. The hydrodynamic converter according to claim 1, wherein said primary clutch (PK) connects, via the converter shell (7), the output (6) from said engine with the pump hub (8) of said pump (2).

3. The hydrodynamic converter according to claim 1, wherein an outer disc carrier of said primary clutch (PK) is connected with the converter shell (7) and the inner disc carrier of said primary clutch (PK) is connected with the pump hub (8).

4. The hydrodynamic converter according to claim 1, wherein a transmission system pressure is regulated by one of with or without a pressure ramp independently of the converter pressure.

5. The hydrodynamic converter according to claim 1, wherein said pressure for disengaging said primary clutch (PK) is regulatable with or without a pressure ramp.

6. The hydrodynamic converter according to claim 5, wherein said primary clutch (PK) has a baffle plate (16) which facilitates a rotation-pressured compensation.

7. The hydradynamic converter according to claim 1, wherein said primary clutch (PK) can be engaged by reducing the pressure acting on the piston (11) of said primary clutch (PK).

8. The hydrodynamic converter according to claim 1, wherein for exact regulation of torque of said primary clutch (PK), the converter pressure can be measured for determining a clutch actuation pressure via a return of the pressure to a control valve or by a pressure sensor.

9. The hydrodynamic converter according to claim 1, wherein a toothing, mounted upon an outer border of said primary clutch (PK), can be used for driving at least one of an accessory unit, a PTO's direct engine-driven gear and to caliper an engine rotational speed.

10. The hydrodynamic converter according to claim 1, wherein said primary clutch comprises at least one of a pressure sensor (14) for detecting a piston pressure and a rotational speed sensor (15) for detecting the pump rotational speed.

11. The hydrodynamic converter according to claim 1, wherein the hydrodynamic converter further comprises a converter lock-up clutch (WK).

12. The hydrodynamic converter according to claim 1, wherein said primary clutch is mounted in said transmission (G) to facilitate coupling of the hydrodynamic converter to the transmission (G).

13. A hydrodynamic converter for a power train of a motor vehicle comprising a pump (2) a turbine (3) connected with a transmission input shaft (4) and a stator (5), and the pump (2) being detachably connectable, via a primary clutch (PK), with an output (6) from an engine;

wherein the primary clutch (PK) is situated in the transmission (G); and the primary clutch (PK) is engaged by a spring (12), and a piston (11) of the primary clutch (PK) is movable by converter pressure, against a bias of the spring (12), to disengage the primary clutch (PK); and a gap between a pump hub (8) and a guide wheel shaft (9) is sealed so that the oil can be fed to an inner disc carrier of the primary clutch (PK), and the inner disc carrier has apertures (10) such that the oil arrives at discs by passing through the apertures (10), grooves are provided in a friction lining which outwardly convey the oil, and the oil flows axially to the converter (1) through the gap between the pump hub (8) and a converter shell (7) and via holes in the gap between the pump hub (8) and the guide wheel shaft (9).

14. The hydrodynamic converter according to claim 13, wherein a toothing, mounted upon an outer periphery of the primary clutch (PK), is available for driving at least one of an accessory unit, a PTO's direct engine-driven gear and to caliper an engine rotational speed.

15. The hydrodynamic converter according to claim 13, wherein the primary clutch comprises at least one of a pressure sensor (14) for detecting a piston pressure and a rotational speed sensor (15) for detecting the pump rotational speed.

16. The hydrodynamic converter according to claim 13, wherein the hydrodynamic converter further comprises a converter lock-up clutch (WK).

17. The hydrodynamic converter according to claim 13, wherein the primary clutch is mounted in the transmission (G) to facilitate coupling of the hydrodynamic converter to the transmission (G).

18. The hydrodynamic converter according to claim 13, wherein the primary clutch (PK) connects, via the converter shell (7), the output (6) from the engine with the pump hub (8) of the pump (2).

19. The hydrodynamic converter according to claim 13, wherein an outer disc carrier of the primary clutch (PK) is connected with the converter shell (7) and the inner disc carrier of the primary clutch (PK) is connected with the pump hub (8).

* * * * *